US008156627B2

(12) United States Patent
Yui

(10) Patent No.: US 8,156,627 B2
(45) Date of Patent: Apr. 17, 2012

(54) METHODS OF FORMING FRONT PANELS OF BOTTLED WATER DISPENSERS

(76) Inventor: George Yui, Toronto (CA)

( * ) Notice: Subject to any disclaimer, the term of this patent is extended or adjusted under 35 U.S.C. 154(b) by 414 days.

(21) Appl. No.: 12/416,138

(22) Filed: Mar. 31, 2009

(65) Prior Publication Data

US 2010/0242248 A1 Sep. 30, 2010

(51) Int. Cl.
*B23P 17/00* (2006.01)

(52) U.S. Cl. .......................................................... 29/422

(58) Field of Classification Search .................... 29/422, 29/428, 446, 448, 469; 222/173, 165, 166, 222/169, 172, 183

See application file for complete search history.

(56) References Cited

U.S. PATENT DOCUMENTS

2007/0297776 A1* 12/2007 Greenway et al. ............ 392/451

* cited by examiner

*Primary Examiner* — John C Hong

(57) ABSTRACT

Methods for manufacturing a front portion of a bottled water dispenser are provided. The methods include forming a top panel and a bottom panel from sheet metal, such that the top and bottom panels exhibit an exterior surface that is convex. The top and bottom panels are formed by bending a left and right side portion thereof inwards, in order to create the convex exterior surface of the top and bottom panels. The methods further include forming a middle panel from sheet metal, such that an exterior surface of the middle panel is concave. The middle panel is formed by applying a draw force to the center portion of the middle panel to create the concave exterior surface—and bending the left and right side portions of the middle panel inward. The bottom, middle, and top panels may then be connected to each other.

10 Claims, 4 Drawing Sheets

METHODS OF FORMING FRONT PANELS OF BOTTLED WATER DISPENSERS

FIELD OF THE INVENTION

The present invention relates generally to the field of bottled water dispensers and, more particularly, to methods of forming the front panels of bottled water dispensers.

BACKGROUND OF THE INVENTION

The demand for clean and healthy drinking water is increasing dramatically, which is being driven by the rapid growth in population and standards of living across the globe. This demand has translated into a continuing need for safe, clean, and easy to use water dispensers, including for both hot and cold water.

Many of the currently-available bottled water dispensers are constructed from a combination of steel and plastic materials. More particularly, many of the currently-available water dispensers have at least two front panels, often with a lower front panel being constructed of steel and the upper (or upper and middle) front panels being constructed of plastic. The upper (or upper and middle) front panels are often constructed from plastic to allow a recessed area to be easily formed in the middle, front portion of the dispenser, which is configured to house the water spout(s) and make room for a so-called drip tray (onto which a container may be placed to receive water). These plastic parts may be formed using, for example, injection molding procedures or other methods known in the art.

The use of plastic materials to form these panels of a water dispenser suffers from at least several drawbacks. For example, plastic materials are not as dense as, for example, stainless steel. As such, manufacturing the front panels with plastic reduces the total weight and sturdiness of the dispenser. In addition, a trend has emerged which favors a complete stainless steel look on the front area of appliances, which is relatively easy to manufacture for appliances having a substantially planar front side, such as refrigerators. However, for appliances having more contoured front surfaces, manufacturing such contoured surfaces using stainless steel can be considerably more difficult and cost-intensive.

As the following will demonstrate, many of the foregoing problems with currently-available water dispensers are addressed by the present invention.

SUMMARY OF THE INVENTION

According to certain aspects of the invention, methods for manufacturing a front portion of a bottled water dispenser are provided. In certain preferred embodiments of the invention, the methods include forming a top panel and a bottom panel from sheet metal, such that the top and bottom panels exhibit an exterior surface that is convex. The top and bottom panels are formed by bending a left and right side portion thereof inwards. The invention provides that bending the side portions of the panels inward, causes the center portion thereof to bow outward, thereby creating the convex exterior surface of the top and bottom panels. According to such embodiments, the methods further comprise forming a middle panel from sheet metal, such that a portion of the exterior surface of the middle panel is concave. The middle panel is preferably formed by applying a draw force to the center portion of the middle panel to create the concave exterior surface—and bending the left and right side portions of the middle panel inward. The bottom, middle, and top panels may then be connected to each other, which together form a front portion of a bottled water dispenser which includes a contiguously connected bottom, middle, and top panel—all of which may be manufactured using, for example, stainless steel.

According to other aspects of the invention, bottled water dispensers are provided that comprise a front portion that is manufactured using the methods described herein. More particularly, the bottled water dispensers will comprise a front portion comprised of stainless steel (consisting of three interconnected panels), which exhibits a convex outer shape, with the exception of a concave section located in the middle panel described herein. The concave section will comprise a drip tray, and will be adapted to receive containers into which water may be dispensed from one or more water spouts—which also will be located within the concave section (preferably in the top portion thereof).

The above-mentioned and additional features of the present invention are further illustrated in the Detailed Description contained herein.

DETAILED DESCRIPTION OF THE INVENTION

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figure 3:
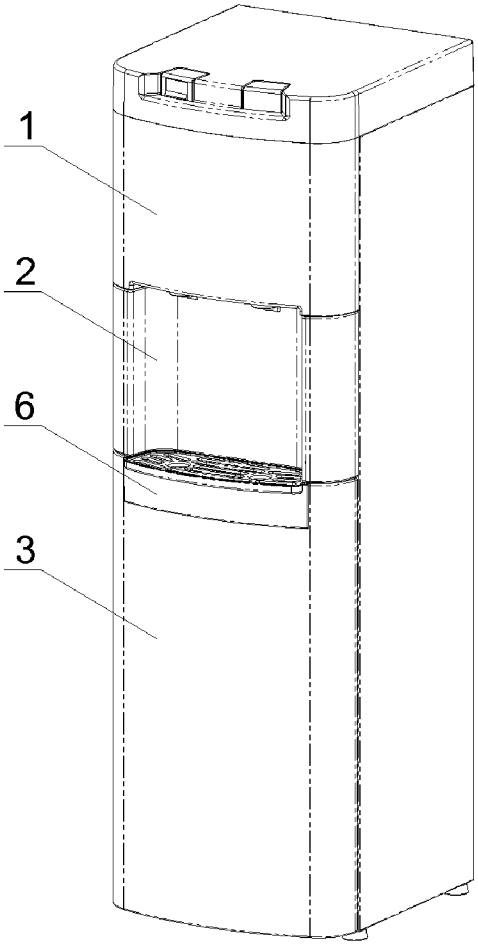
FIG. 3: A perspective view of one embodiment of the bottom, middle, and top panels of the water dispenser described herein, with the drip tray connected to the top portion of the bottom panel.
Figure 4:
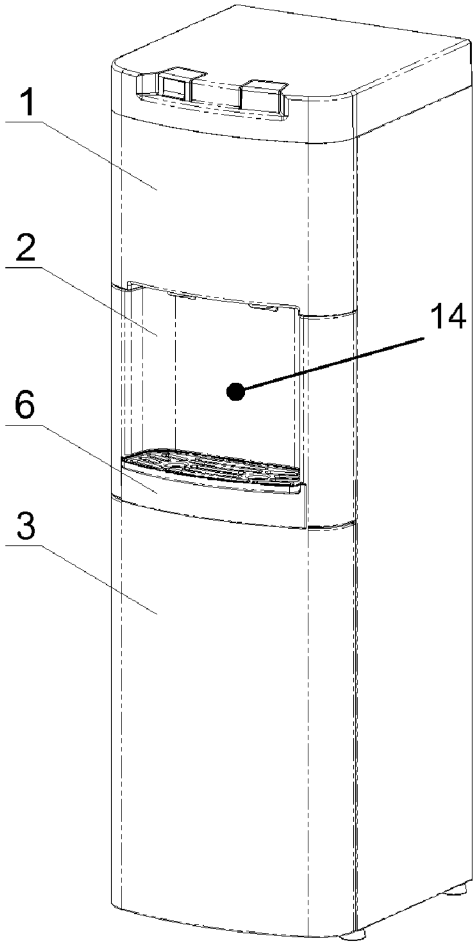
FIG. 4: A perspective view of another embodiment of the bottom, middle, and top panels of the water dispenser described herein, with the drip tray connected to the bottom portion of the middle panel.

Referring to FIGS. 1-8, according to certain preferred embodiments of the invention, methods for manufacturing a front portion of a bottled water dispenser are provided. The methods generally comprise forming a top panel 1 and a bottom panel 3 from sheet metal, such that the top and bottom panels 1,3 comprise an exterior surface that is convex. In other words, when viewing the water dispenser from its exterior, the top and bottom panels 1,3 will exhibit a relatively convex shape and appearance. This is illustrated in FIGS. 3 and 4.

Figure 5:
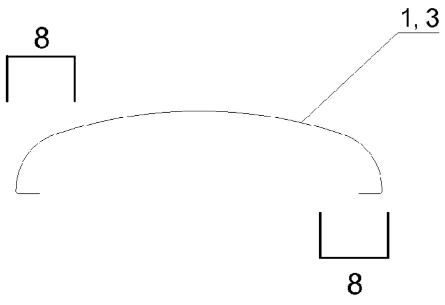
FIG. 5: A cross-sectional top view of the top and bottom panels of the water dispenser described herein.
Figure 6:
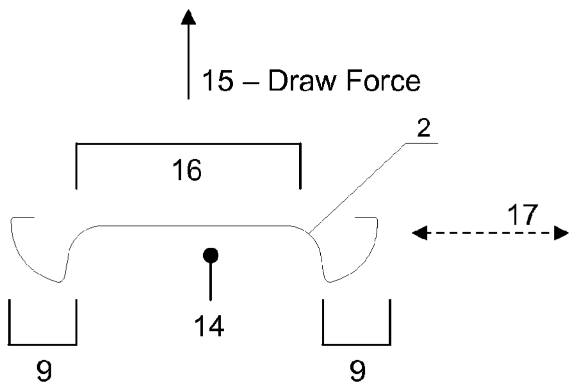
FIG. 6: A cross-sectional top view of the middle panel of the water dispenser described herein.
Figure 7:
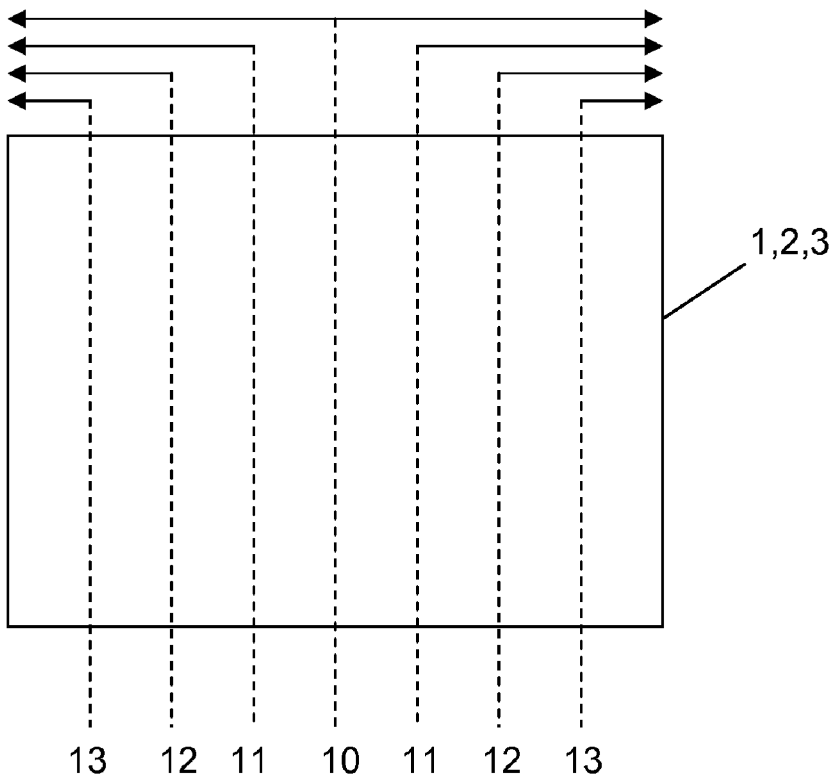
FIG. 7: A diagram showing the areas of the bottom, middle, and top panels that may be subjected to the bending forces described herein.
Figure 8:
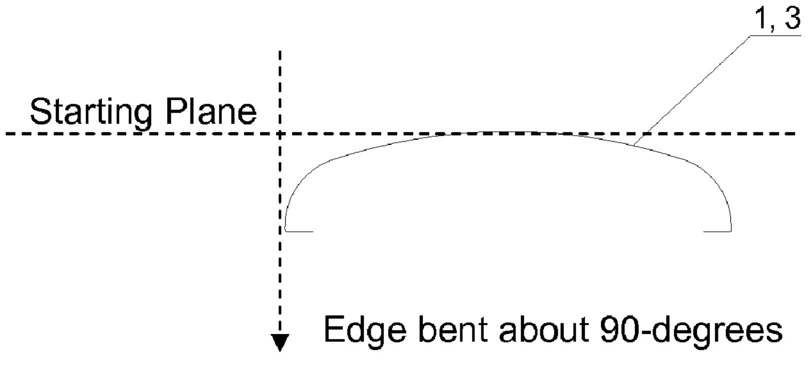
FIG. 8: A diagram showing a cross-sectional view of the arched-shaped bent side portions of the top and bottom panels.

The invention provides that the top and bottom panels 1,3 are formed by bending a left and right side portion 8 thereof inwards, in order to create the convex exterior surface of the top and bottom panels. The left and right side portions 8, after being bent as described herein, are illustrated in FIG. 5. As shown therein, the bending of the left and right side portion 8 of the top and bottom panels 1,3 creates the convex outer surface of such panels. The amount of the left and right side portions 8,9 of the top, middle, and bottom panels 1,2,3 that this subjected to a bending force, as described herein, may vary. For example, referring to FIG. 7, if the sheet metal that forms each of such panels is originally flat, each half 10 of the panel may be subjected to the bending forces, or about 75% of each half 11, or about 50% of each half 12, or about 25% of each half 13 may be subjected to the bending forces. The amount of each panel that is subjected to such bending forces will depend on the size (width) of the panel, and the type of convex shape that is desired. As shown in FIGS. 5 and 6, for the water dispensers illustrated herein, less than 50% of each half of the left and right side portions 8,9 of the top, middle, and bottom panels 1,2,3 are subjected to the bending force, such as about the outer 30% of each such half.

In certain preferred embodiments, the invention provides that the left and right side portions 8,9 of the top, middle, and bottom panels 1,2,3 are bent inwards to a degree to achieve an arched side portion. For example, referring to FIGS. 7 and 8, the side portions 8,9 are bent to create a cross-section that turns the metal about one-quarter of a full-turn. In other words, using a planar piece of sheet metal as the beginning material, the edges of the side portions 8,9 are bent about 90-degrees inwards (relative to the plane of the starting beginning material). This is further illustrated in FIG. 8. Preferably, the side portions 8,9, for the top, middle, and bottom panels 1,2,3, are bent to approximately the same degree, such that the final bent piece of metal for each of the top, middle, and bottom panels 1,2,3 exhibits the same, or substantially the same, cross-sectional profile for the side portions 8,9 thereof. This way, when the top, middle, and bottom panels 1,2,3 are assembled and connected to each other, the corner areas of the front portion of the water dispenser will preferably exhibit a smooth and contiguous transition point between the top, middle, and bottom panels 1,2,3, as illustrated in FIGS. 3 and 4.

Referring to FIGS. 4 and 6, the invention provides that the middle panel 2 is also manufactured from sheet metal, such that the exterior surface of the middle panel is concave 14. According to certain preferred embodiments, the invention provides that the middle panel 2 is formed by applying a draw force 15 to a center portion 16 of the middle panel 2 to create the concave exterior surface 14 of the middle panel 2. By drawing the center portion 16 of the middle panel 2 in this manner, and bending the left and right side portions 9 of the middle panel 2 inward as described above, the configuration shown in FIG. 6 is achieved. As illustrated in FIG. 6, the invention provides that the draw force will preferably be imparted by applying heat and pressure to pull the center portion 16 of the middle panel 2 away from (i.e., perpendicular with) a plane 17 that runs tangential with the surface of the original piece of sheet metal.

Figure 1:
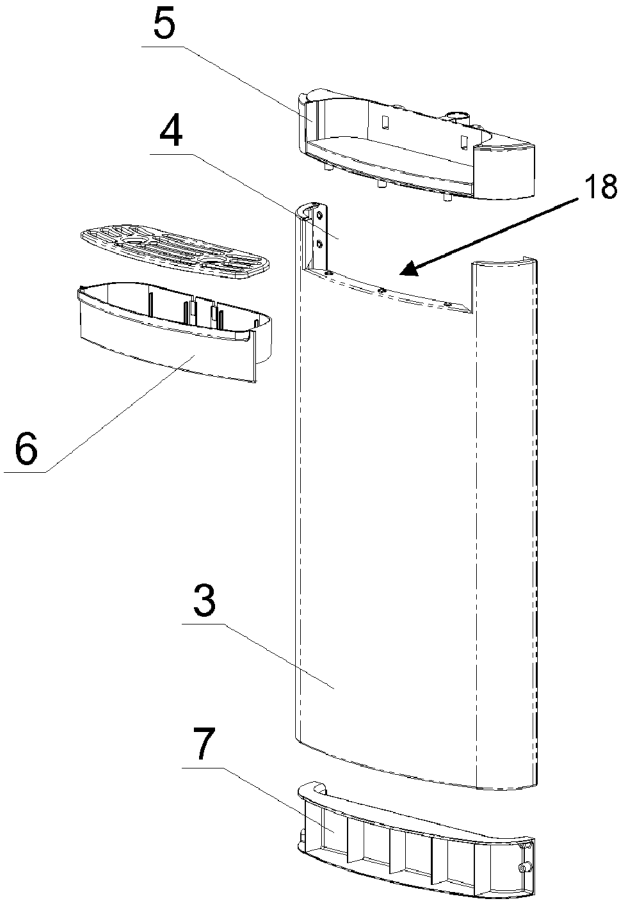
FIG. 1: A perspective, disassembled view of one embodiment of the bottom panel and drip tray described herein.
Figure 2:
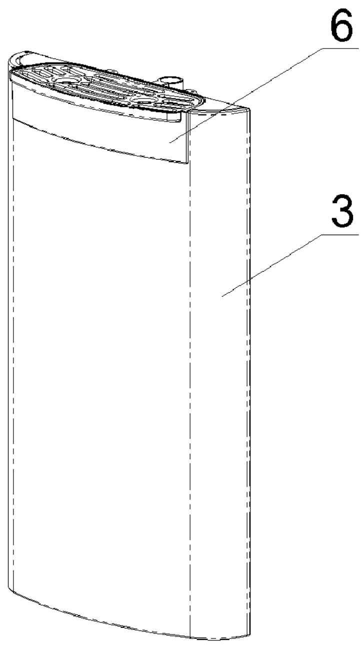
FIG. 2: A perspective view of one embodiment of the bottom panel connected to the drip tray described herein.

According to certain embodiments, referring to FIG. 1, the invention provides that the manufacturing process described herein further comprises bending a top edge 18 of the bottom panel 3 inwards (i.e., towards the interior of the water dispenser). The invention provides that the bent top edge 18 may comprise about 3-7 mm of the top edge of the bottom panel 3, such as about 5 mm. The invention provides that the bent top edge 18 is adapted to receive and be affixed to a drip tray assembly 5,6, such that the installed drip tray assembly will be positioned near the lower portion of the concave area 14 of the middle panel 2.

The drip tray assembly 5,6 may comprise one or a series of connected parts, such as a base 5 that is mechanically attached to the bent top edge 18 of the bottom panel 3, a reversibly removable drip collecting reservoir 6, and a screen (which may support a container when water is being dispensed therein). The invention provides that the drip tray assembly 5,6 may be comprised of any suitable material, such as plastic, and may be fastened to the bent top edge 18 using any of various mechanical means, such as screws, rivets, snaps, and other mechanical fasteners. In the embodiment shown in FIG. 1, the bent top edge 18 comprises a series of apertures into which corresponding dowels or screws may be disposed through the base 5, to attach the drip tray assembly 5,6 to the bent top edge 18.

In certain alternative embodiments, the invention provides that a bottom edge of the middle panel 2 may be bent outwards (away from the interior of the dispenser), with the bent portion being adapted to receive and be affixed to a drip tray (e.g., using mechanical fasteners to attach a top portion of the drip tray to the outwardly bent bottom edge of the middle panel 2). Similar to the embodiment described above, the bent portion of the bottom edge of the middle panel 2 comprises about 3-7 mm of the bottom edge of the middle panel 2 or, preferably, about 5 mm thereof. FIG. 3 shows an embodiment of the front portion of the water dispenser having the drip tray connected to the top edge of the bottom panel 3, whereas FIG. 4 shows an embodiment of the front portion of the water dispenser having the drip tray connected to the bottom edge of the middle panel 2.

Referring now to FIG. 1, the invention provides that, in certain embodiments, a reinforcement panel 7 may be attached adjacent to an interior surface of a bottom portion of the bottom panel 3. Preferably, the reinforcement panel 7 will comprise an outer surface that is adapted to make contact with (and potentially be attached to) the interior surface of the bottom panel 3—to provide further reinforcement and structural support to the bottom part of the water dispenser.

Once the top, middle, and bottom panels 1,2,3 are constructed as described herein, the invention provides that the panels may be connected to each other vis-à-vis welding the panels together and/or using any of various mechanical means, such as screws, rivets, snaps, and other mechanical fasteners.

According to other aspects of the invention, bottled water dispensers are provided that comprise a front portion that is manufactured using the methods described herein. More particularly, the bottled water dispensers will comprise a front portion comprised of sheet metal (comprising three interconnected panels), which exhibits a convex outer shape, with the exception of concave section located in the middle panel described herein. The concave section will comprise a drip tray, and will be adapted to receive containers into which water may be dispensed from one or more water spouts—which also will be located within the concave section (preferably in the top portion thereof). The top, middle, and bottom panels 1,2,3 may be constructed from stainless steel or other metal alloys, such as aluminum.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A process for manufacturing a front portion of a bottled water dispenser, which comprises the steps of:

(a) forming a top panel and a bottom panel from sheet metal, wherein (i) the top and bottom panels comprise an exterior surface that is convex and (ii) the top and bottom panels are formed by bending a left and right side portion thereof inwards to create the convex exterior surface of the top and bottom panels;

(b) forming a middle panel from sheet metal, wherein an exterior surface of the middle panel is concave and the middle panel is formed by (i) applying a draw force to a center portion of the middle panel to create the concave exterior surface of the middle panel and (ii) bending a left and right side portion of the middle panel inward; and (c) connecting the bottom panel to the middle panel, and connecting the middle panel to the top panel.

2. The process of claim 1, wherein the left and right side portion of the top, middle, and bottom panels are bent inwards to a degree to achieve an arched side portion.

3. The process of claim 2, wherein the left and right side portions of the top, middle, and bottom panels are bent inwards about 90-degrees.

4. The process of claim 3, wherein the draw force comprises the steps of applying heat and pressure to pull the center portion of the middle panel away from a tangential plane of the sheet metal to form the concave exterior surface of the middle panel.

5. The process of claim 4, which further comprises bending a top edge of the bottom panel inwards, wherein the bent portion is adapted to receive and be affixed to a drip tray.

6. The process of claim 5, wherein the bent portion comprises about 3-7 mm of the top edge of the bottom panel.

7. The process of claim 4, which further comprises bending a bottom edge of the middle panel outwards, wherein the bent portion is adapted to receive and be affixed to a drip tray.

8. The process of claim 7, wherein the bent portion comprises about 3-7 mm of the bottom edge of the middle panel.

9. The process of claim 8, wherein the sheet metal is comprised of a material selected from the group consisting of stainless steel and metallic alloys.

10. The process of claim 9, which further comprises attaching a reinforcement panel adjacent to an interior surface of a bottom portion of the bottom panel.

* * * * *